(12) United States Patent
Sit

(10) Patent No.: US 7,063,005 B1
(45) Date of Patent: Jun. 20, 2006

(54) AUTOMATIC COFFEE MAKER WITH GRINDER

(75) Inventor: Antony Sit, Hong Kong (HK)

(73) Assignee: Sun Cupid Industrial Ltd., Hong Kong (HK)

( * ) Notice: Subject to any disclaimer, the term of this patent is extended or adjusted under 35 U.S.C. 154(b) by 392 days.

(21) Appl. No.: 10/340,311

(22) Filed: Jan. 9, 2003

(51) Int. Cl.
*A47J 31/00* (2006.01)

(52) U.S. Cl. ............... 99/286; 99/288; 99/289 R
(58) Field of Classification Search ............... 99/286, 99/287, 289 R, 288, 279, 300, 307; 241/65, 241/101.2, 100
See application file for complete search history.

(56) References Cited

U.S. PATENT DOCUMENTS

| | | | | |
|---|---|---|---|---|
| 4,226,175 A | * | 10/1980 | Sandor | 99/286 |
| 4,624,177 A | * | 11/1986 | Ito et al. | 99/286 |
| 5,387,256 A | * | 2/1995 | Enomoto | 99/286 |
| 6,227,102 B1 | | 5/2001 | Sham et al. | 99/286 |
| 6,367,370 B1 | | 4/2002 | Sham et al. | 99/286 |
| 6,389,957 B1 | | 5/2002 | Sham et al. | 99/286 |
| 6,439,106 B1 | * | 8/2002 | Sham et al. | 99/286 |

FOREIGN PATENT DOCUMENTS

| | | |
|---|---|---|
| JP | 04097710 | 3/1992 |
| JP | 04097714 | 3/1992 |
| JP | 04097716 | 3/1992 |
| JP | 04348722 | 12/1992 |
| JP | 05111436 | 5/1993 |
| JP | 05300838 | 11/1993 |
| JP | 06343557 | 12/1994 |
| JP | 05161550 | 6/2003 |

* cited by examiner

*Primary Examiner*—Reginald L. Alexander
(74) *Attorney, Agent, or Firm*—Raymond Nuzzo

(57) ABSTRACT

The invention is directed to a coffee maker. In one embodiment, the coffee maker [comprises] a housing carrying a reservoir for receiving water for brewing, a heater supported by the housing for receiving water from the reservoir and heating the water in order to brew coffee, an infused beverage extractor disposed over a beverage container, a grinding basket positioned above the extractor and having an interior for receiving ground coffee beans, a device for heating the grinding basket, and a grinding device adjacent the grinding basket and in communication with the interior of the grinding basket. The grinding basket has an exterior surface. The coffee maker has a heating element attached to the exterior surface of the grinding basket for heating the grinding basket. The coffee maker also has a heat distributor disposed over the grinding basket and the heating element to effect a uniform distribution of heat.

20 Claims, 14 Drawing Sheets

AUTOMATIC COFFEE MAKER WITH GRINDER

BACKGROUND OF THE INVENTION

1. Field of the Invention

The invention relates to an automated drip-type coffee making machine.

2. Description of Related Art

Automated drip-type coffee making machines are known in the art. Typical coffee making machines are described in U.S. Pat. Nos. 6,227,102, 6,367,370 and 6,389,957 and in Japanese Patent No. 3066557 and published Japanese patent application nos. 02-214928 (publication number 04-097716), 02-214921 (publication number 04-097710), 04-109816 (publication number 05-300838), and 03-276018 (publication number 05-111436). Many of these coffee-making machines utilize a coffee bean grinding basket which holds coffee beans to be ground, a grinding mechanism for grinding the coffee beans, and an extractor. Frequently, when the grinding basket is flushed with water, some coffee beans will stick on the wet surface of the grinding basket thereby causing incomplete grinding. Some of these commercially available coffee-making machines also utilize a mesh filter for receiving and filtering the ground coffee bean material before the ground coffee bean material enters the extractor. The mesh filter also prevents the coffee beans from falling down. Frequently, coffee bean residue accumulates on both sides of the mesh filter. Typically, the mesh filters can be removed and cleaned. However, in many commercially available coffee-makers, the mesh filters are difficult to remove and reinstall.

SUMMARY OF THE INVENTION

Therefore, it is an object of the present invention to provide an improved automatic grind and brew drip-type household coffee maker.

Another object of the present invention is to provide an improved automatic grind and brew drip-type coffee maker with a heated grinding basket that eliminates the problem of the coffee beans sticking to the grinding basket.

A further object of the present invention is to provide an improved automatic grind and brew drip-type coffee maker with an improved mesh filter that significantly reduces the accumulation of coffee bean residue thereon and which is relatively easy to remove and reinstall.

In aspect, the present invention is directed to a coffee maker comprising a housing carrying a reservoir for receiving water for brewing, a heater supported by the housing for receiving water from the reservoir and heating the water in order to brew coffee, an infused beverage extractor disposed over a beverage container, a grinding basket positioned above the extractor and having an interior for receiving ground coffee beans, a device for heating the grinding basket, and a grinding device adjacent the grinding basket and in communication with the interior of the grinding basket.

In a related aspect, the present invention is directed to a coffee maker comprising a housing carrying a reservoir for receiving water for brewing, a heater supported by the housing for receiving water from the reservoir and heating the water in order to brew coffee, an infused beverage extractor disposed over a beverage container, a grinding basket positioned above the extractor and having an interior for receiving ground coffee beans, a grinding device adjacent the grinding basket and in communication with the interior of the grinding basket, and means for filtering ground coffee beans ground by the grinding device.

In a further aspect, the present invention is directed to a coffee maker comprising a housing carrying a reservoir for receiving water for brewing, a heater supported by the housing for receiving water from the reservoir and heating the water in order to brew coffee, an infused beverage extractor disposed over a beverage container, a grinding basket positioned above the extractor and having an interior for receiving ground coffee beans, a device for heating the grinding basket, a grinding device adjacent the grinding basket and in communication with the interior of the grinding basket wherein the portion of the interior of the grinding basket in communication with the grinding device defines a grinding chamber, means for filtering ground coffee beans emanating from the grinding chamber, and means for releasably attaching the filtering means to the housing.

Objects and advantages of the present invention will be apparent from the ensuing description of the present invention.

BRIEF DESCRIPTION OF THE DRAWINGS

The above-mentioned and other features and objects of this invention and the manner of obtaining them will become apparent and the invention itself will be best understood by reference to the following description of an embodiment of the invention taken in conjunction with the accompanying drawings, wherein.

DETAILED DESCRIPTION OF THE PREFERRED EMBODIMENT

Figure 1:
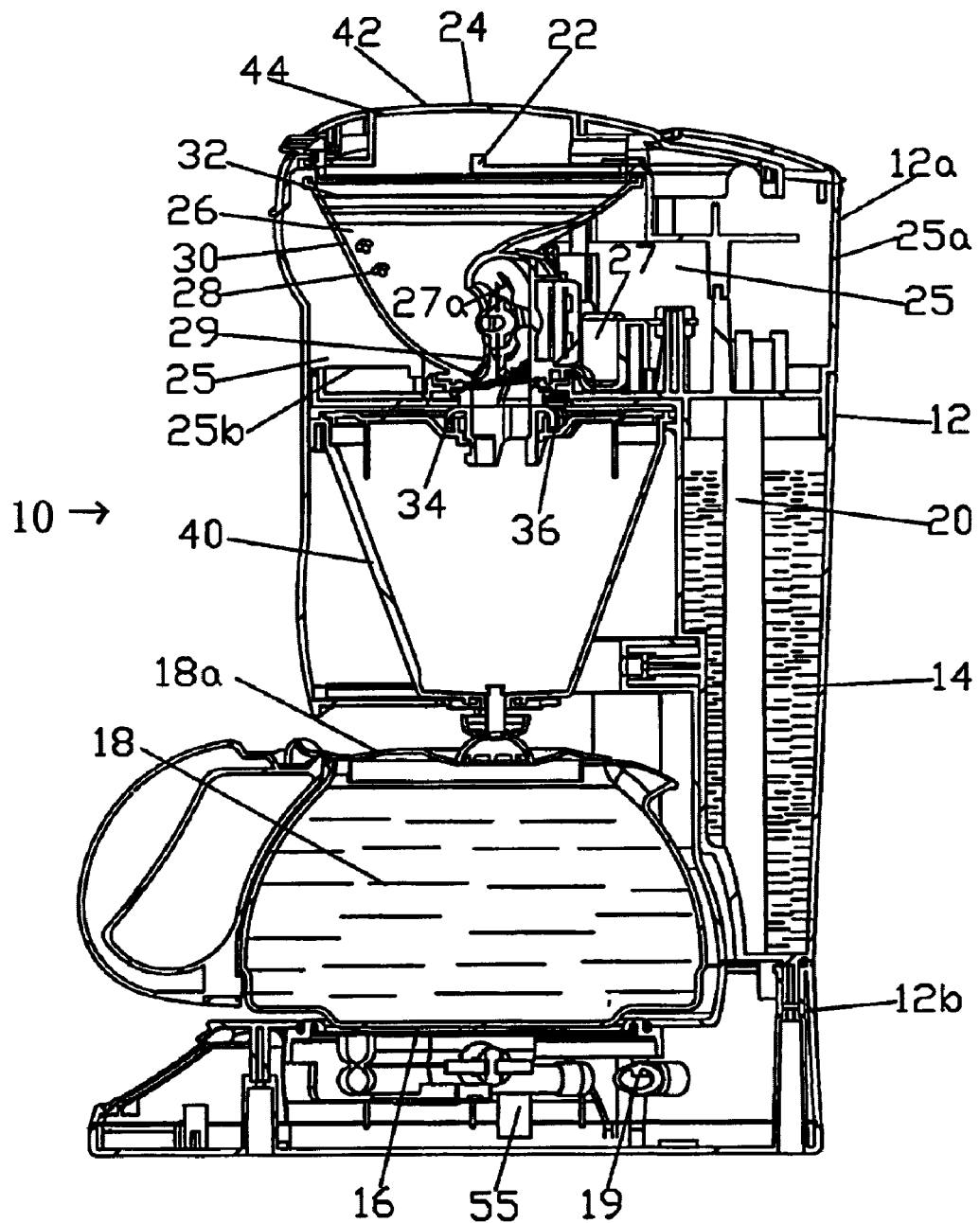
FIG. 1 is a side sectional view of the coffee maker of the present invention with a carafe in place.
Figure 2:
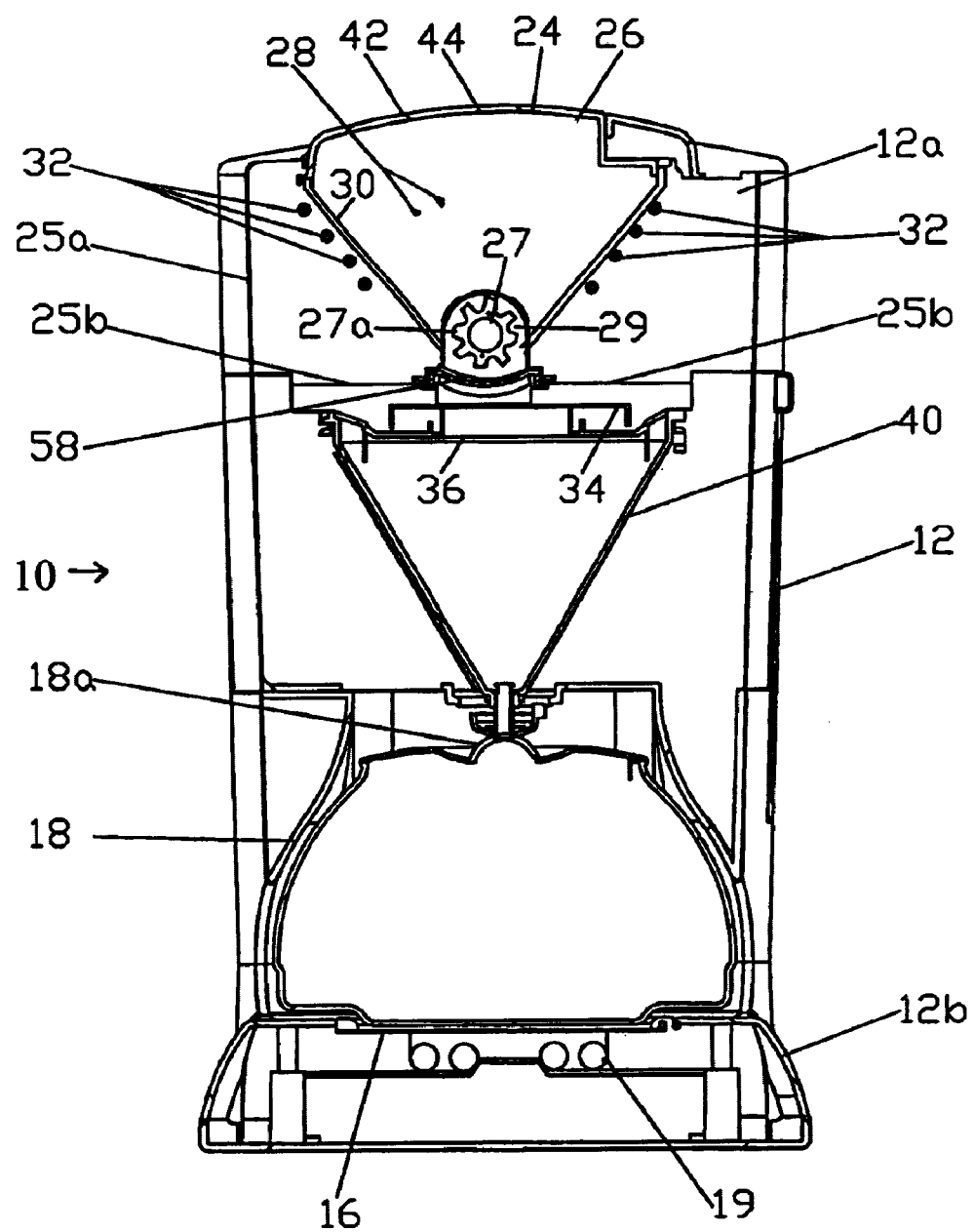
FIG. 2 is a front sectional view of the coffee maker of the present invention.

Referring FIG. 1, there is shown coffee-maker 10 of the present invention. Coffee-maker 10 generally comprises housing 12 that comprises upper housing portion 12a and lower housing portion 12b. Housing 12 supports water tank 14 and has beverage container receiving member 16 for receiving and supporting beverage container 18 that can store brewed coffee. Beverage container 18 is a glass carafe or a thermal carafe which includes lid 18a that is hingeably attached to carafe 18. The beverage container receiving member 16 functions to hold carafe 18 in the desired position, and may be equipped with a heating device, such as a warming plate, to keep the temperature of the brewed coffee in the carafe 18 at a desired temperature. Housing 12 carries heater element 19 and hot water tube 20. Hot water tube 20 is double walled has an outlet 22 disposed beneath the bottom surface of grinding basket lid 24. Upper housing portion 12a includes a cabinet 25 defined by walls 25a and horizontal panel member 25b of upper housing portion 12a. Grinding basket 26 and electric motor 27 are located within cabinet 25. Electric motor 27 includes grinding blades 27a that are in communication with the interior of grinding basket 26 so as to form grinding chamber 29. Grinding blades 27a preferably have the configuration as shown in FIG. 2. Such a grinding blade configuration is described in Japanese Patent No. 3066557, issued May 19, 2000. A vibration damping means (not shown but known in the art) may be used to absorb and dissipate vibration caused by motor 27 and to reduce the level of noise caused by the operation of motor 27.

Figure 3:
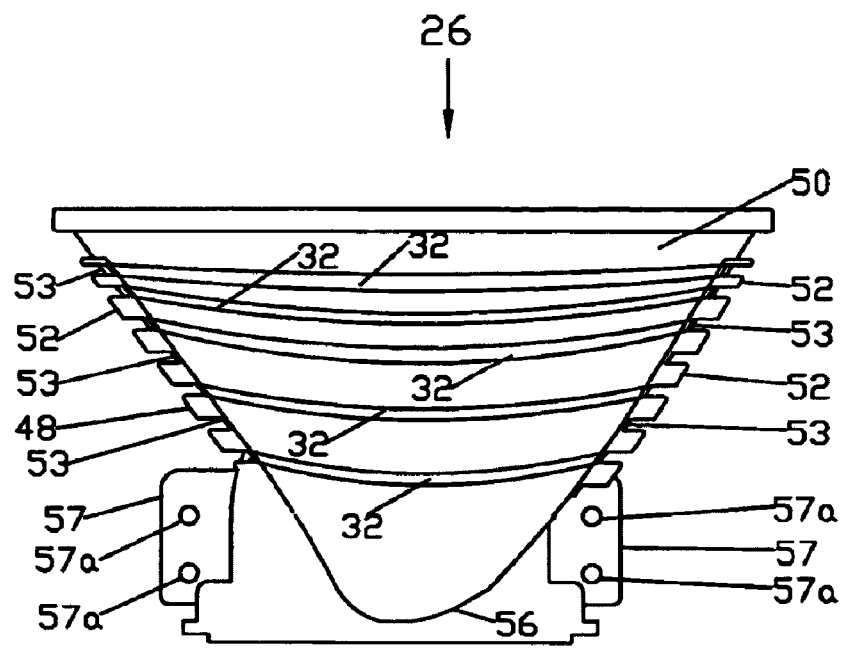
FIG. 3 is a view of the heated grinding basket of the coffee maker of the present invention.
Figure 4:
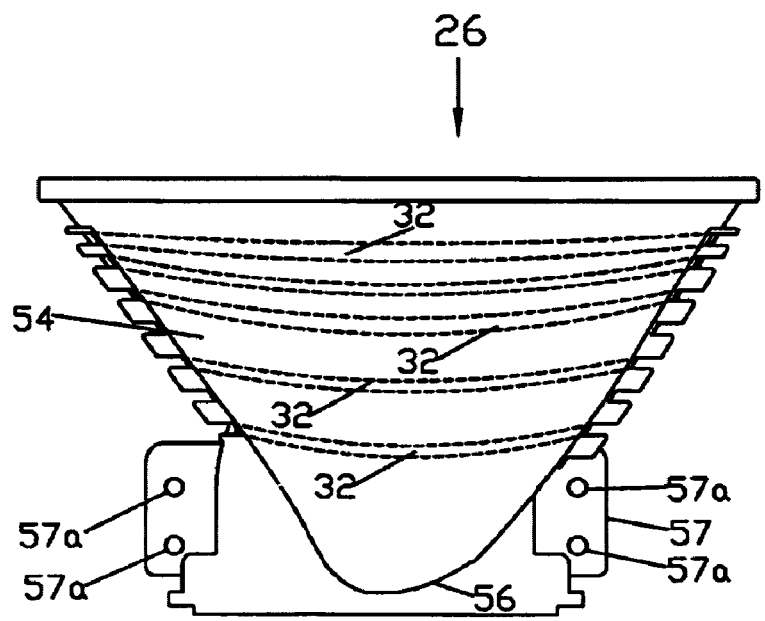
FIG. 4 is a view of the heated grinding basket of FIG. 3 having a heat distributing cover thereon.
Figure 5:
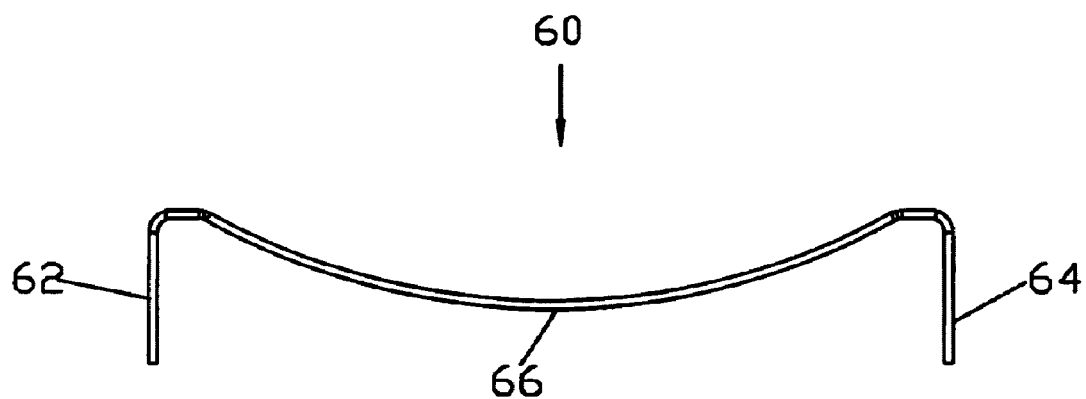
FIG. 5 is side view of a mesh filter in accordance with the present invention.
Figure 6:
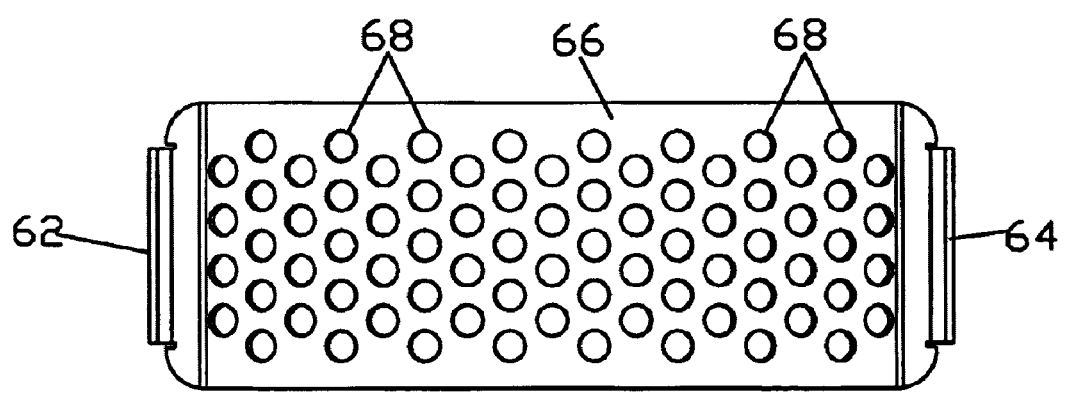
FIG. 6 is a plan view of the mesh filter of FIG. 5.

Referring to FIGS. 1–3, grinding basket 26 that holds coffee beans 28 that are to be ground. Grinding basket 26 has a streamlined configuration and has sloped interior surfaces 30 so as to facilitate introduction of coffee beans 28 into the grinding chamber 29. Referring to FIG. 3, grinding basket 26 includes heating elements 32 which effect heating of grinding basket 26 in order to prevent coffee beans from sticking to the interior surfaces 30 when grinding basket 26 is flushed with water. In one embodiment, heating elements 32 comprise electrical wires that are attached to grinding basket 26. Heating elements 32 are electrically connected to a source of electrical power. Grinding basket 26 is further described in the ensuing description.

Referring to FIG. 1, coffee maker 10 further includes moving and sealing cover 34 which rests upon warming lid 36. The moving and sealing cover 34 provides a substantial seal between the bottom of grinding basket 26 and warming lid 36. Moving and sealing cover 34 and warming lid 36 are known in the art and are further described in the ensuing description.

Coffee maker 10 further includes a water inlet (not shown) and a water outlet (not shown) in fluid communication with water tank or reservoir 14 and which are known in the art and described in Japanese Patent No. 3066557 and U.S. Pat. No. 6,389,957, the disclosures of which patents are incorporated herein by reference. In one embodiment, coffee-maker 10 includes a shut-valve (not shown) for preventing hot water from coming back into water tank 14.

Referring to FIG. 1, coffee maker 10 further includes filter basket 40 of the hinged, swing type, which functions as an infused beverage extractor, and is disposed over carafe 18. Filter basket 40 is preferably adapted to accommodate conventional paper-type filters of the type used in coffee makers. Filter basket 40 is well known in the art.

In a preferred embodiment, coffee maker 10 includes an automatic shut-off feature wherein when the user opens grinding basket lid 24 or filter basket 40, coffee maker 10 shuts off automatically.

As shown in FIG. 2, grinding basket lid 24 has top surface 42 and bottom surface 44. In a preferred embodiment, grinding basket lid 24 is hingeably attached to housing 12. In one embodiment, coffee-maker 10 includes a drip-stop release lever (not shown) which is activated when carafe 18 is removed, so as to stem the flow of infused beverage from the swing-type filter basket and extractor 40. Such a drip-stop release lever (not shown) is well known in the art.

Referring to FIG. 1, grinding basket lid 24 is preferably dome-shaped to permit the even spreading of heated water emitted by outlet 22, so as to allow the hot water to clean the inner surfaces of grinding basket 26 and wash away significant amounts of powdered or ground coffee. Thus, grinding basket lid 24 performs the functions of dispersing water in a pattern sufficient to cleanse the inside surfaces of grinding basket 26.

Referring to FIGS. 1–4, there is shown heated grinding basket 26 in accordance with the present invention. Heated grinding basket 26 has a generally streamlined shaped portion 48 to facilitate flow of ground coffee beans therethrough. Grinding basket 26 has outer surface 50 and a plurality of protruding members 52 that extend outward from outer surface 50 and are separated by spaces or gaps 53. Heating wire 32 is tightly wrapped around outer surface 50 so that each loop of wire 32 is disposed within spaces 53. Spaces 53 maintain each loop of heater wire 32 in the same position and prevent all the loops of heater wire 32 from sliding down surface 50 of grinding basket 26. After heater wire 32 is wrapped around surface 50 and is disposed in spaces 53, a heat distributing cover 54 is wrapped over heater wire 32 and surface 50 in order to provide uniform heat distribution (see FIG. 1). In one embodiment, heat distributing cover 54 is comprised of a sheet of aluminum. However, other suitable materials may be used for uniformly distributing heat created by heater wire 32. Heater wire 32 is electrically connected to printed circuit board 55. Printed circuit board 55 provides a voltage to heater wire 32 that is sufficient to effect heating of grinding basket 26. In one embodiment, the voltage used to power heater wire 32 is the same as the voltage typically available from household power outlets. The voltage is applied to heater wire 32 in the same phase with the water heater 19 of coffee maker 10. Thus, when water heater 19 is powered on, voltage is applied to heater wire 32. Grinding basket 26 includes bottom portion 56 for removably attaching grinding basket 26 to housing 12. Bottom portion 56 comprises flange members 57 that defines a plurality of openings 57a that receive fastening members (not shown) which are used to attach grinding basket 26 to housing 12. In one embodiment, grinding basket 26 is fabricated from plastic, such as polypropylene.

Figure 7:
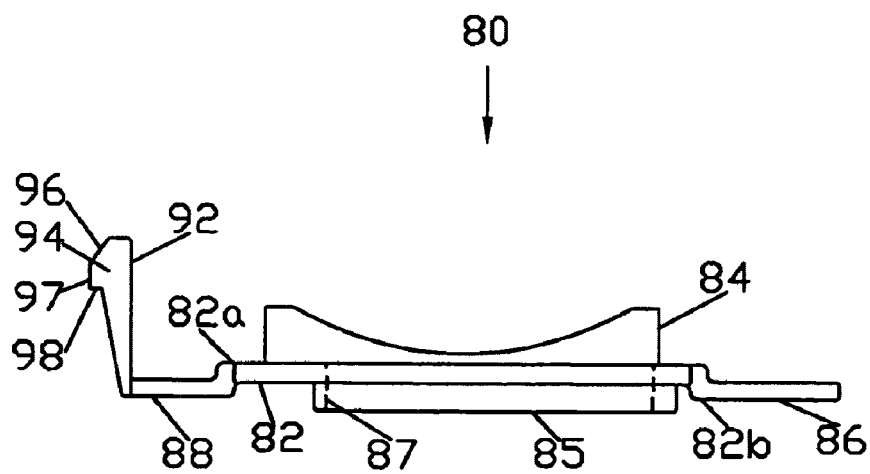
FIG. 7 is side view of a filter holder for holding the filter of FIG. 5.
Figure 8:
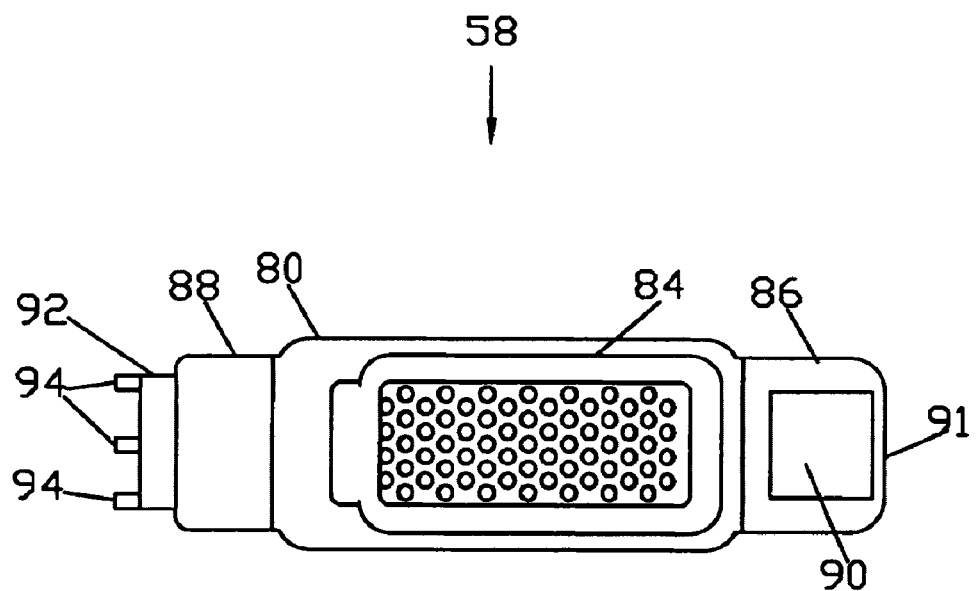
FIG. 8 is a plan view of the filter holder of FIG. 7.

As shown in FIGS. 1 and 5–8, coffee-maker 10 further includes mesh filter assembly 58 in accordance with the present invention. Mesh filter assembly 58 comprises mesh filter 60 shown in FIGS. 5 and 6. Mesh filter 60 comprises ends 62 and 64 and central filter portion 66. Central filter portion 66 has a generally curved shape. Central filter portion 66 includes a plurality of perforations 68. Mesh filter 60 is preferably formed from stainless steel for longer life and easier cleaning. Referring to FIGS. 7 and 8, mesh filter assembly 58 further includes mesh filter holder 80. Mesh filter holder 80 comprises base portion 82 having top side 82a and bottom side 82b, filter seat 84 that is attached to base portion 82, and end portions 86 and 88 that are attached to base portion 82. Filter holder 80 further comprises rim portion 85 which extends downward from bottom side 82b. Filter seat 84 is sized to receive mesh filter 60. Filter holder 80 has opening 87 therethrough which extends through base portion 82 and rim portion 85 and which is in communication with mesh filter 60. Thus, when filter holder 80 is attached to horizontal panel member 25b in accordance with the invention, as is described in the ensuing description, ground coffee beans emanating from the grinding chamber 29 enter mesh filter 60 and pass through opening 87. Rim portion 85 is in communication with moving and sealing cover 34 on filter lid 36 (see FIG. 1) and thus, the ground coffee beans pass into filter basket 40.

As shown in FIG. 8, end portion 86 of filter holder 80 defines opening 90 and includes edge portion 91. In a preferred embodiment, opening 90 is generally rectangular shaped. The purpose of opening 90 is discussed in the ensuing description. End portion 88 further includes generally vertically extending flange member 92. Referring to FIG. 7, flange member 92 comprises rib portions 94. Each rib portion 94 has beveled surface 96, generally flat vertical surface 97, and generally horizontal bottom edge 98. Flange member 92 has a predetermined degree of resiliency such that it can slightly bend to the left or right without breaking off base portion 82. The purpose of flange member 92 is discussed in the ensuing description. In accordance with the invention, a mechanism, described in the ensuing description, is used to easily remove and reinstall mesh filter assembly 58 so as to allow mesh assembly 58 to be cleaned.

Figure 9:
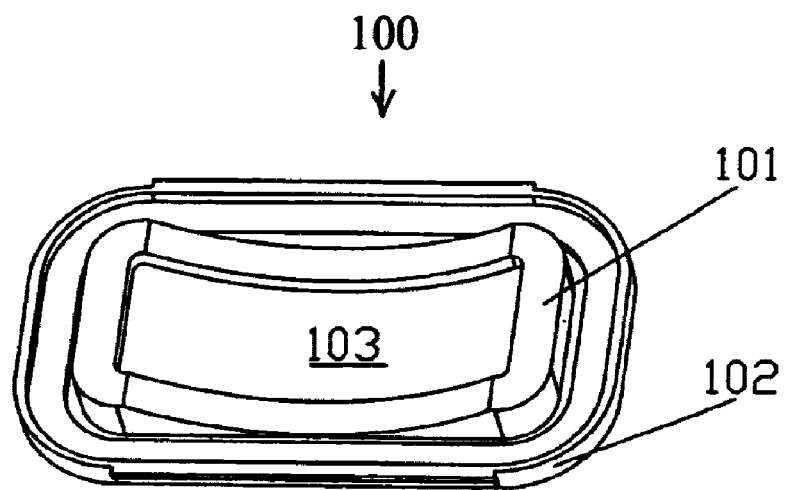
FIG. 9 is a perspective view of a seal member that is used with the filter holder of FIGS. 7 and 8.
Figure 10:
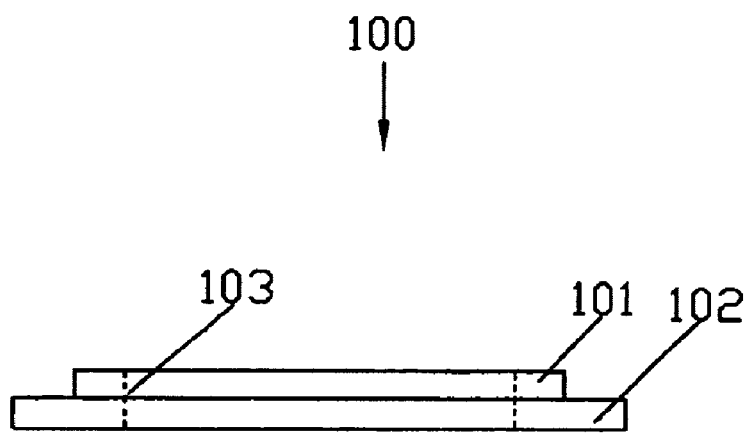
FIG. 10 is side view of the seal member of FIG. 9.
Figure 11:
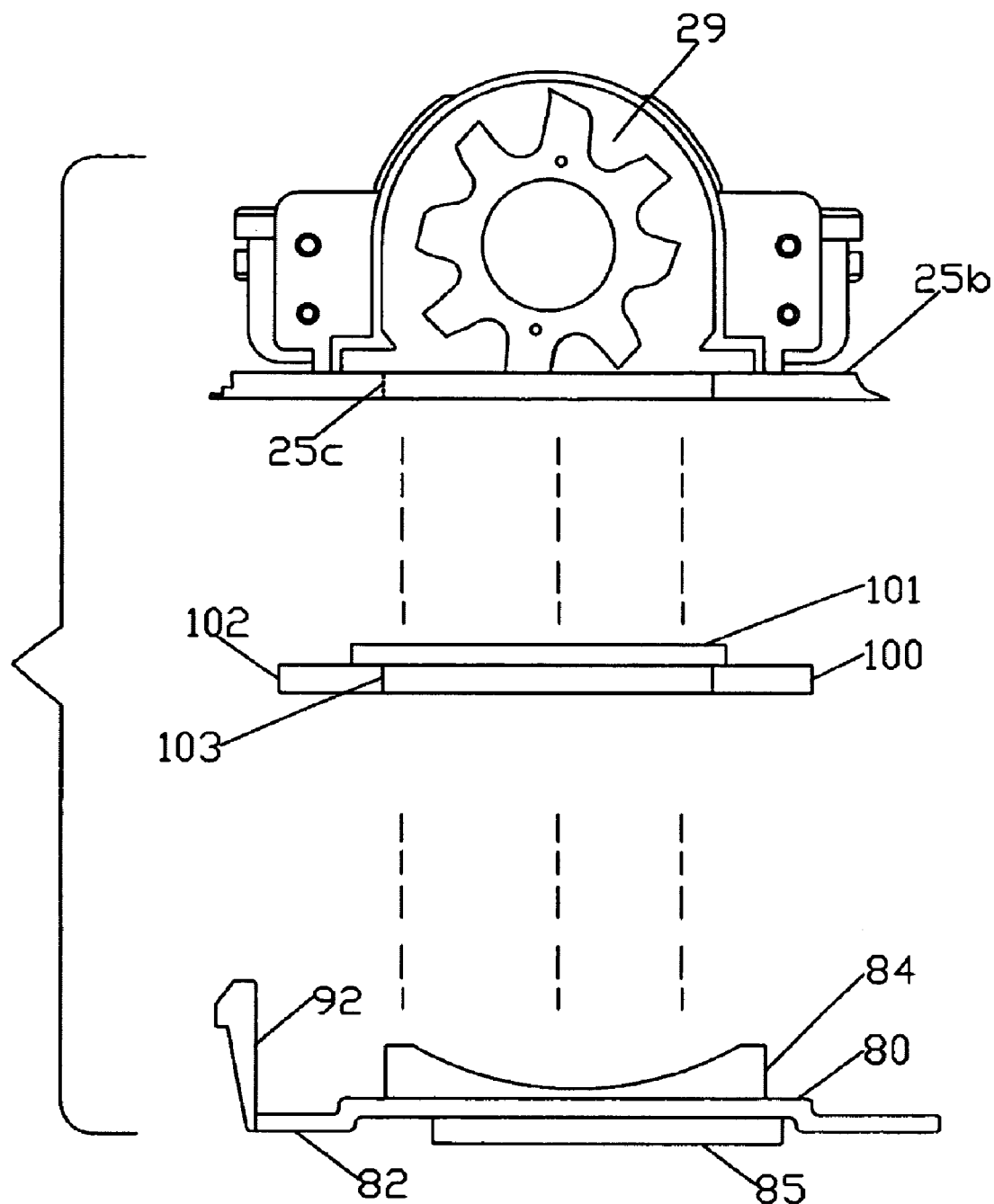
FIG. 11 is an exploded view illustrating the manner in which the filter holder, seal member and motor cabinet are interconnected, the remaining portion of the coffee maker not being shown so as to facilitate viewing of said interconnection.
Figure 12:
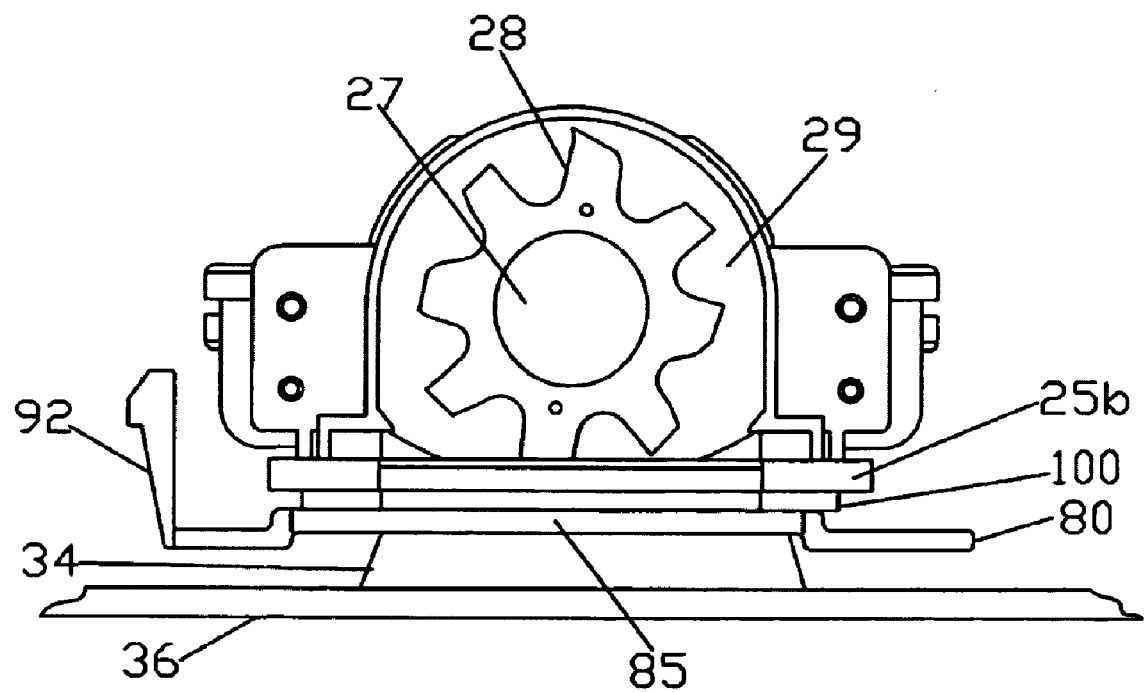
FIG. 12 is a partial side view illustrating the interconnection of the filter holder, seal member and motor cabinet.

Referring to FIGS. 9 and 10, there is shown seal member 100 that is used with mesh filter assembly 58. Seal member 100 has a generally rectangular shape and comprises raised central portion 101 and peripheral portion 102. Raised central portion 101 has a shape that conforms to the shape of mesh filter 60. Raised central portion 101 defines opening 103. When filter holder 80 is mounted to seal member 100, mesh filter 60 is exposed through opening 103. Raised central portion 101 has an interior region (not shown) that is accessible through the bottom of seal member 100 and which is sized for receiving filter seat 84 so that mesh filter 60 is exposed through opening 103. Referring to FIGS. 11 and 12, raised central portion 101 is sized for frictional insertion into opening 25c in bottom panel member 25b so that opening 103 of seal member 100 is in communication with grinding chamber 29. When mesh filter 60 is exposed in opening 103 and in communication with grinding chamber 29, peripheral portion 102 creates a seal with the bottom side 25e of horizontal panel member 25b. In a preferred embodiment, seal member 100 is rigidly attached to bottom side 25e of horizontal panel member 25b. Grinding basket 26 is not shown in FIGS. 11 and 12 in order to facilitate understanding of the interconnection of filter holder 80, seal member 100, and grinding chamber 29. In a preferred embodiment, seal member 100 is fabricated from material that provides sufficient sealing properties such as rubber or silicon rubber.

Figure 13:
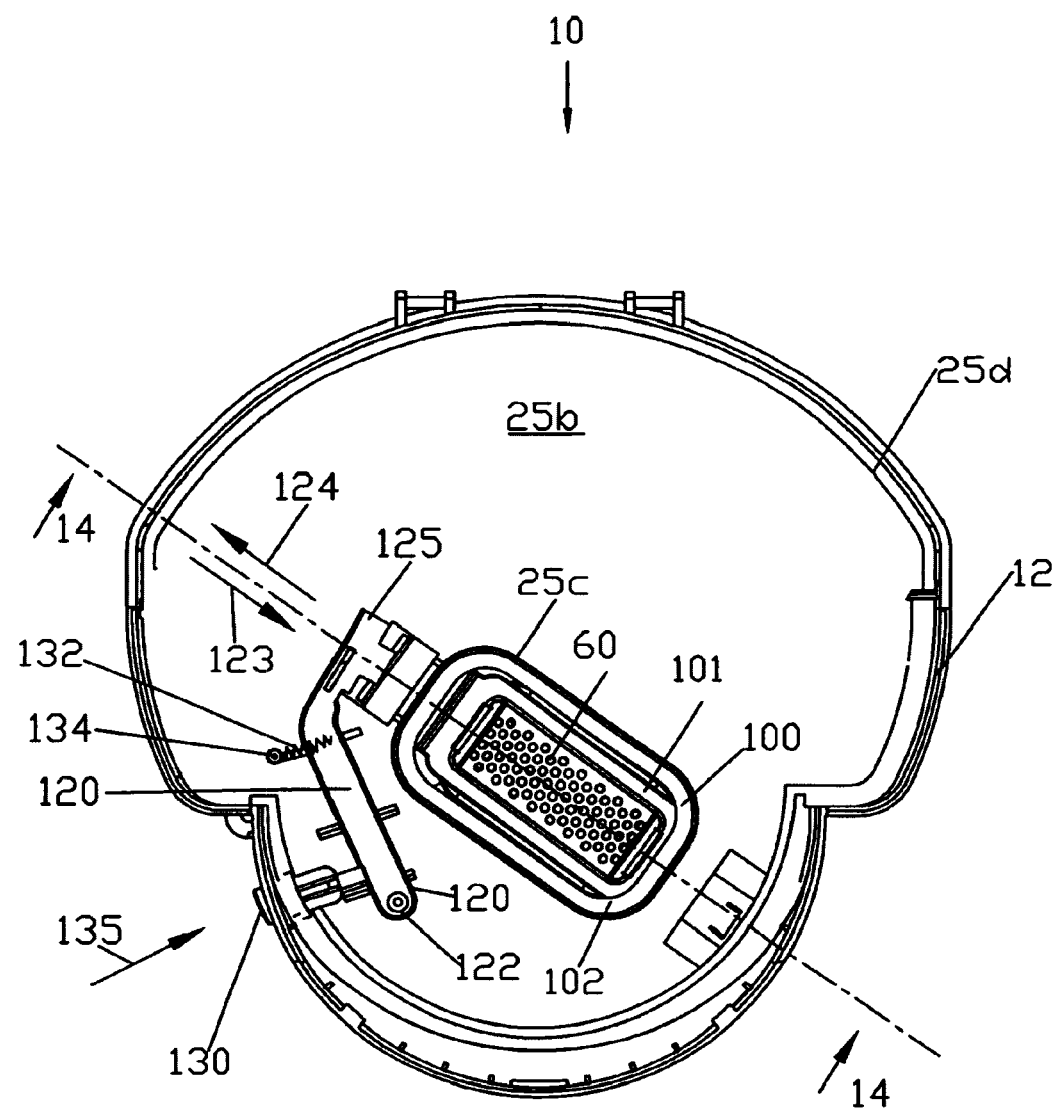
FIG. 13 is a plan view illustrating a mechanism for removing and reinstalling the filter holder, the remaining portion of the coffee maker not being shown in order to facilitate viewing of said mechanism.
Figure 14:
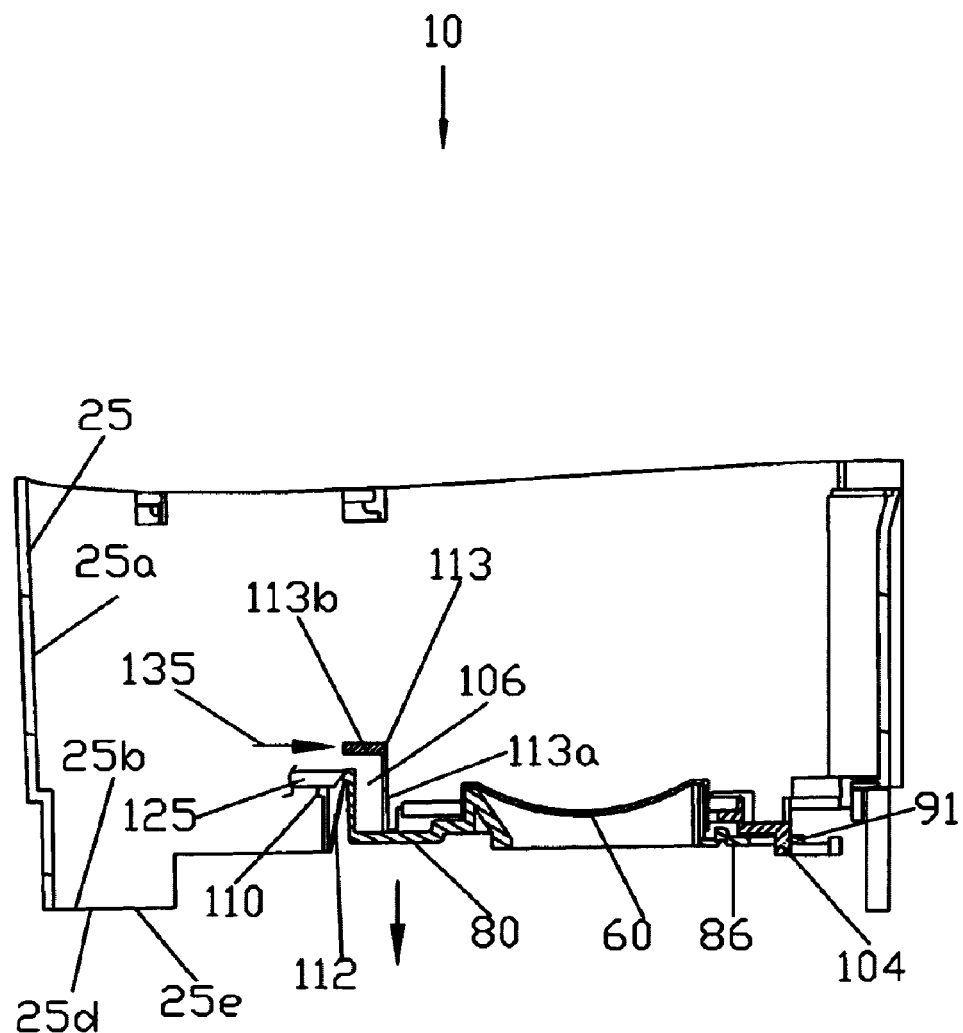
FIG. 14 is a cross-sectional view taken along line 14—14 of FIG. 13.

Referring to FIGS. 13 and 14, horizontal panel member 25b includes contact members 110 and 112 that extend generally upward from top side 25d of horizontal panel member 25b. Contact member 110 is generally vertical with respect to horizontal panel member 25b. Contact member 112 is generally angulated with respect to contact member 110. Horizontal panel member 25b further includes extending portion 113 which is adjacent opening 106 and which comprises generally vertically portion 113a and generally horizontal portion 113b. Horizontal portion 113b extends above opening 106 and contact members 110 and 112 and functions as a protective guard for contacts 110 and 112, and flange member 92. Horizontal panel member 25b includes portion 104 extending from bottom side 25e of panel member 25b. Portion 104 is sized for insertion into opening 90 of end portion 86 of filter holder 80. Panel member 25b defines opening 106 adjacent tabs 110 and 112 through which flange member 92 is inserted. Seal member 100 is not shown in FIG. 14 in order to facilitate illustration of the removable attachment of filter holder 80 to horizontal panel member 25b. As shown in FIG. 14, in order for a user to attach filter holder 80 to horizontal panel member 25b, the user first maneuvers filter holder 80 so that portion 104 of horizontal panel member 25b is inserted into opening 90 of end portion 86 of filter holder 80. Next, the user pivots filter holder 80 upward so that flange member 92 is inserted through opening 106 and beveled edges 96 of flange member 92 frictionally move against angulated contact member 112. As flange member 92 frictionally moves against contact member 112, flange member 92 bends slightly to the right. The user continues to pivot filter holder 80 until flange member 92 snaps to the left such that contact member 112 is lodged against bottom edge 98 of each rib member 94 of flange member 92. Once contact member 112 is lodged against edges 98, filter seat 84 is completely inserted into opening 103 of seal member 100 (not shown in FIG. 10, but see FIGS. 11 and 12), edge portion 91 of filter holder 80 is supported by portion 104 of bottom side 25e, and mesh filter 60 is in communication with opening 25c and grinding chamber 29. When filter holder 80 completely attached to horizontal panel member 25b, flange member 92 is positioned just below horizontal portion 113b.

Referring to FIG. 13, there is shown a mechanism that allows easy removal of filter holder 80 in accordance with the present invention. The view shown in FIG. 13 is a plan view of top side 25d of horizontal panel member 25b as seen from motor cabinet 25. The mechanism generally comprises lever 120 which is pivotally attached to horizontal panel member 25b at pivot point 122. Lever 120 pivots in the direction indicated by arrows 123 and 124. Lever 120 includes contact head 125 for contacting ribs 94 of flange member 92. Contact head 125 slides upon and is supported by contact member 110. The mechanism further includes push-button 130 and spring 132. Spring 132 has one end attached to lever 120 and another end attached to post member 134 which is attached to and extends upward from horizontal panel member 25b. Push-button 130 is movably attached to housing 12 and is attached to lever 120 (see FIG. 13). When a user depresses push-button 130 in the direction indicated by arrow 135, lever 120 moves in the direction indicated by arrow 123. When the user removes pressure from push-button 130, spring 132 urges lever 120 in the direction indicated by arrow 124. Thus, when a user desires to remove filter holder 80 from coffee-maker 10, the user depresses push-button 130 so that lever 120 moves in the direction indicated by arrow 123. As a result, contact head 125 forces flange member 92 to bend to the right so that angulated contact member 112 is clear of edges 98 of rib members 94 and the weight of filter head 80 causes it to fall downward. The user then moves filter holder 80 laterally so that portion 104 is removed from opening 90 of portion 86 of filter holder 80.

The basic operation of coffee-maker 10 is generally the same as the coffee maker described in the aforementioned U.S. Pat. No. 6,389,957. However, as evident by the foregoing description, heated grinding basket 26, mesh filter assembly 58 and the mechanism shown in FIG. 13 for removing filter holder 80 significantly increases the efficiency of the operation of coffee-maker 10 and facilitates use and maintenance of coffee maker 10.

Coffee beans 28 are introduced to the grinding basket 26. Non-heated water is introduced into the water tank 14. Heating element 32 is powered with a voltage when water heater 19 is activated. Heating element 32 effects heating of grinding basket 26 in order to prevent coffee beans from sticking to the interior surfaces 30 when grinding basket 26 is flushed with water. Coffee beans 28 are ground in grinding chamber 29 by the action of the grinding blades 27a powered by electrical motor 27. When some coffee beans have been ground, more beans are introduced to grinding chamber 29 by the slope of the interior surface 30 of grinding basket 26. Ground coffee moves downward through the mesh filter 60 and passes through the moving and sealing cover 34 on warming lid 36 into filter basket 40. The shape of mesh filter 60 substantially reduces the amount of coffee bean residue on mesh filter 60. In order to remove mesh filter assembly 58 for cleaning, the user simply depresses push-button 130 and removes filter holder 80 as described in the foregoing description.

Referring to FIGS. 15–18, there is shown mesh filter assembly 200 in accordance with an alternate embodiment of the present invention. Mesh filter assembly 200 comprises mesh filter 202 which is substantially the same as mesh filter 60 described in the foregoing description. Mesh filter assembly 200 further includes mesh filter holder 204. Mesh filter holder 204 comprises base portion 206 having top side 208 and bottom side 210, filter seat 212 that is attached to base portion 206, and end portions 215 and 216 that are attached to base portion 206. Filter holder 204 further comprises rim portion 218 which extends downward from bottom side 210. Filter seat 212 is sized to receive mesh filter 202 and has generally the same shape as filter seat 84 described in the foregoing description. Filter holder 204 has opening 220 therethrough which extends through base portion 206 and rim portion 218 and which is in communication with mesh filter 202. Thus, when filter holder 204 is attached to horizontal panel member 25b in accordance with the invention, ground coffee beans emanating from the grinding chamber 29 enter mesh filter 202 and then pass through opening 220. Rim portion 218 is aligned with the opening in moving and sealing cover 34 on filter lid 36 (see FIG. 1) and thus, the ground coffee beans pass into filter basket 40.

Figure 15:
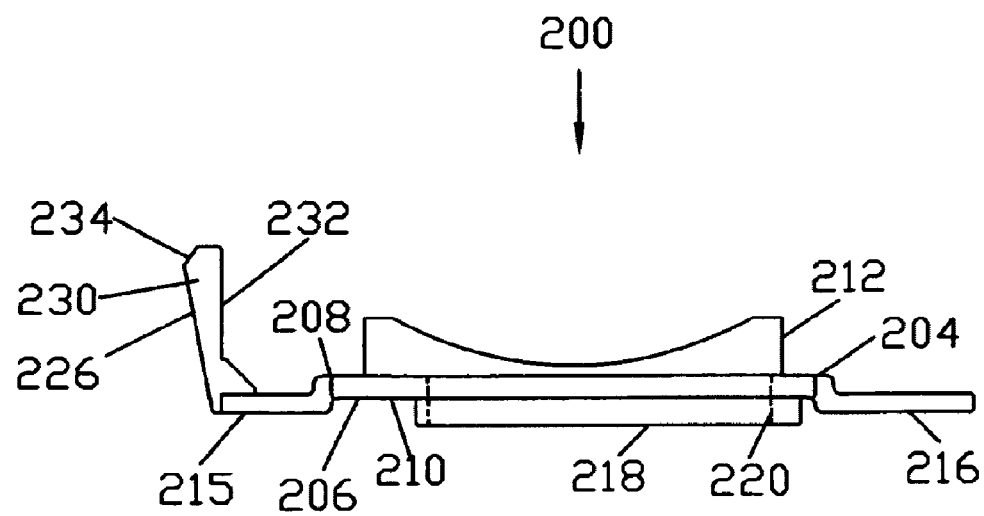
FIG. 15 is a side view of a filter holder in accordance with another embodiment of the invention.
Figure 16:
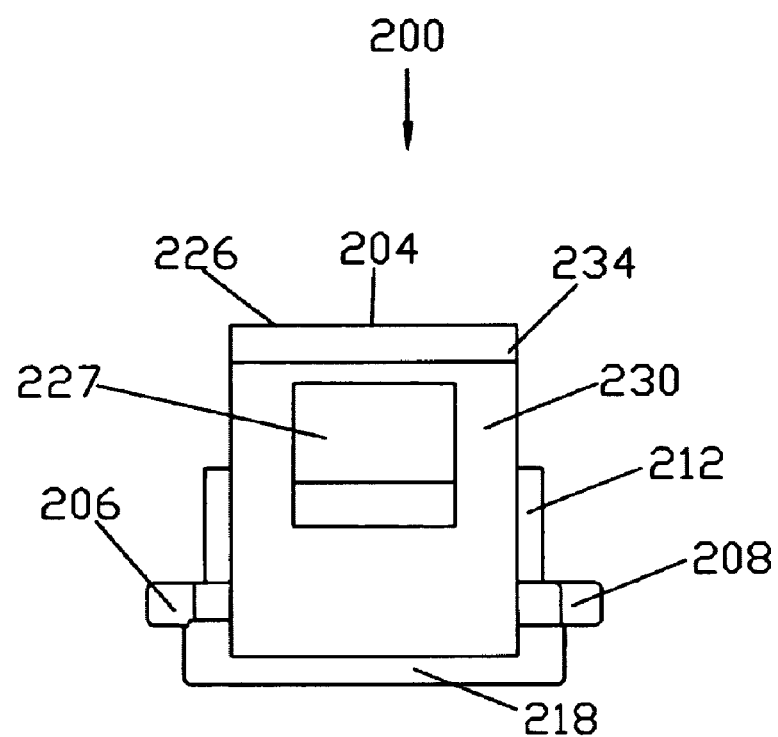
FIG. 16 is an end view taken along line 16—16 of FIG. 15.
Figure 17:
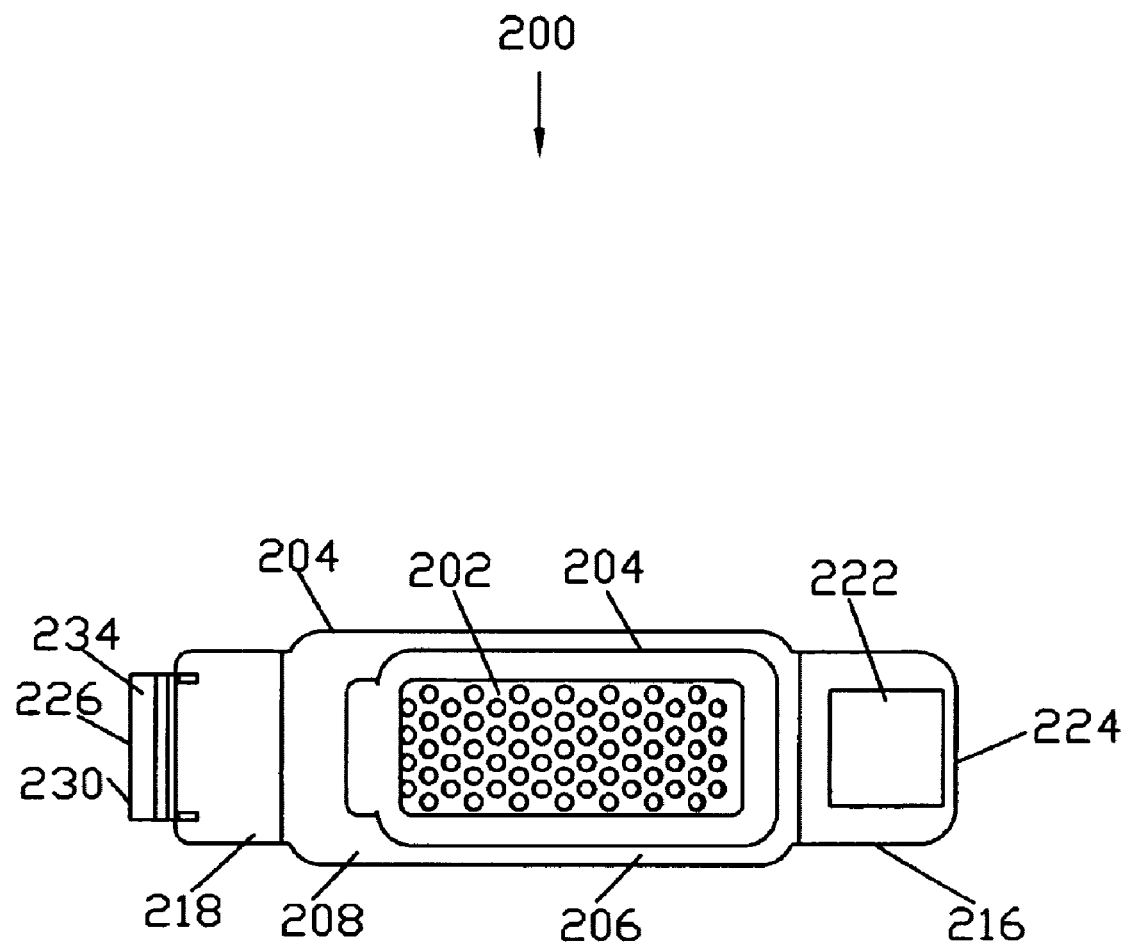
FIG. 17 is a plan view of the filter holder of FIG. 15.

As shown in FIG. 17, end portion 216 of filter holder 204 defines opening 222 and includes edge portion 224. In a preferred embodiment, opening 222 is generally rectangular shaped. The purpose and function of opening 222 and edge portion 224 are substantially the same as the function and purpose of opening 90 and edge portion 91, respectively, of filter holder 80 discussed in the foregoing description. Referring to FIGS. 15 and 16, end portion 215 further includes generally vertically extending flange member 226. Flange member 226 tapers in an upward direction and includes opening 227, side 230 and opposite side 232. Flange member 226 includes beveled edge 234. Flange member 226 has a predetermined degree of resiliency such that it can slightly bend to the left or right without breaking off base portion 206. Filter holder 204 may be used with seal member 100 described in the foregoing description. When filter holder 204 is completely attached to horizontal panel member 25b, flange member 226 is positioned just below horizontal portion 113b.

Figure 18:
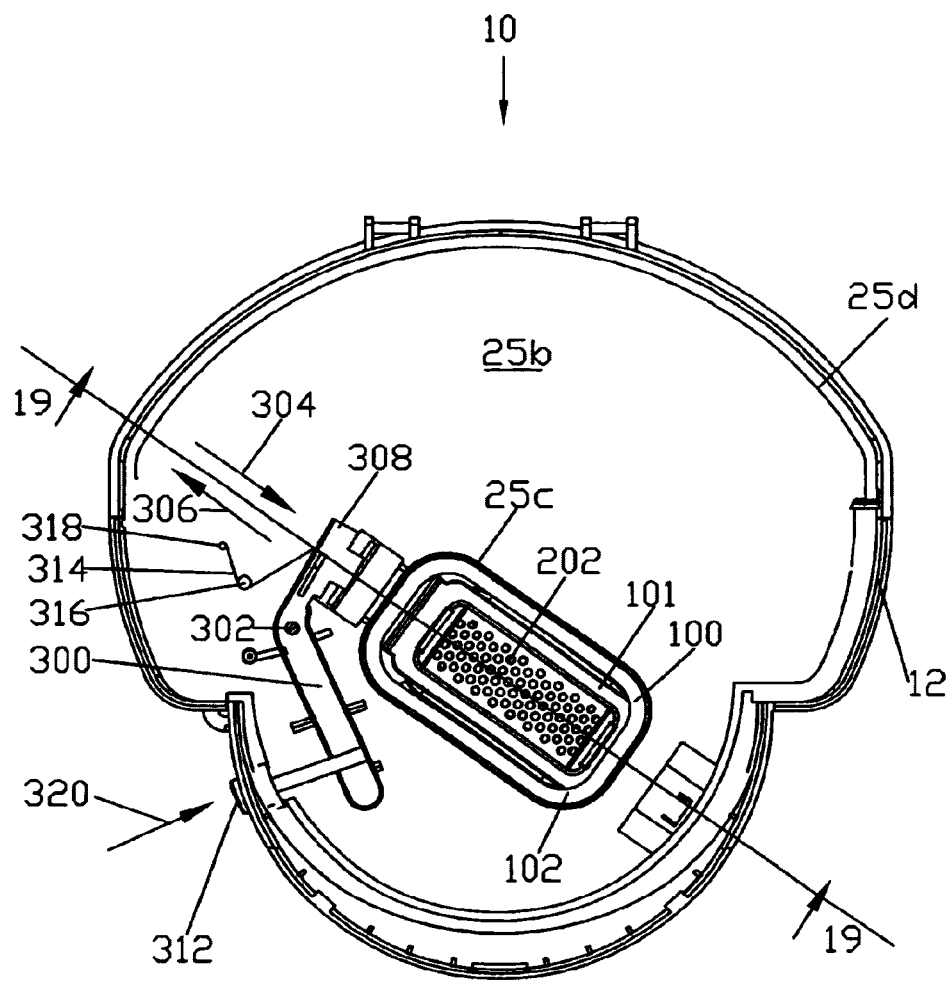
FIG. 18 is a view, similar to FIG. 13, illustrating a mechanism for removing and reinstalling the filter holder of FIG. 15 in accordance with another embodiment of the present invention.
Figure 19:
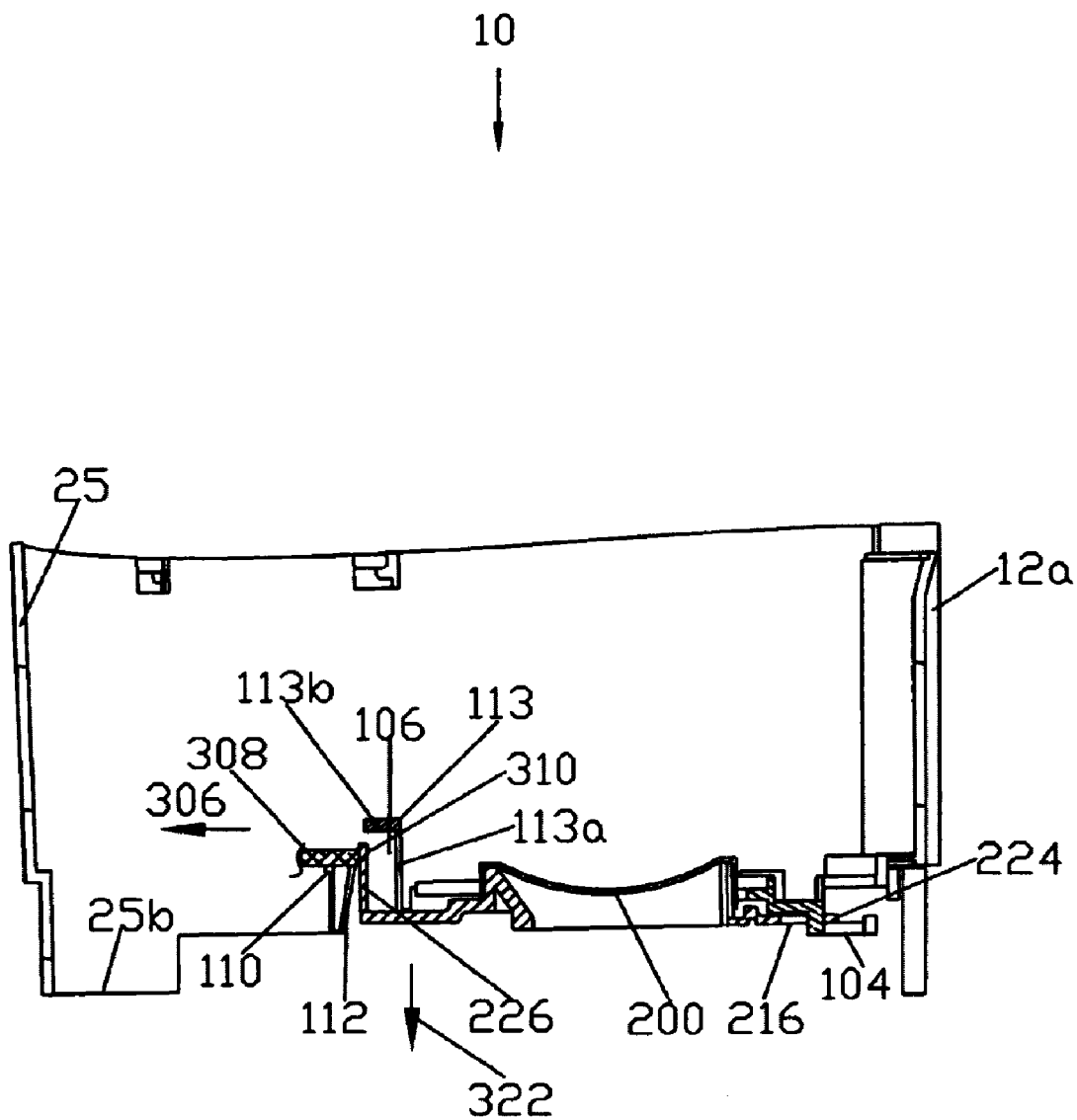
FIG. 19 is a cross-sectional view taken along line 19—19 in FIG. 18.

Referring to FIGS. 18 and 19, there is shown a mechanism for easily removing and reinstalling mesh filter assembly 200 in accordance with another embodiment of the present invention. The view shown in FIG. 18 is a plan view of top side 25d of horizontal panel member 25b as seen from motor cabinet 25. The mechanism generally comprises lever 300 which is pivotally attached to horizontal panel member 25b at pivot point 302. Lever 300 pivots in the direction indicated by arrows 304 and 306. Lever 300 includes contact head 308 that has a beveled edge 310 which is sized for insertion into opening 227 of flange member 226. Contact head 308 slides upon and is supported by contact member 110. The mechanism further includes push-button 312 and spring member 314. Spring member 314 is generally triangular shaped and is attached to post 316 and is interposed between post 318 and contact head 308. Push-button 312 is movably attached to housing 12 and is also attached to lever 300 (see FIG. 18). When a user depresses push-button 312 in the direction indicated by arrow 320, lever 300 moves in the direction indicated by arrow 306. When the user removes pressure from push-button 312, spring member 314 urges lever 300 in the direction indicated by arrow 304.

Referring to FIG. 19, in order for a user to attach filter holder 204 to horizontal panel member 25b, the user first maneuvers filter holder 204 so that portion 104 of horizontal panel member 25b is inserted into opening 222 of end portion 216 of filter holder 204. Next, the user pivots filter holder 204 upward so that tapered flange member 226 is inserted through opening 106 in panel member 25b and beveled edge 234 of flange member 226 frictionally moves against beveled edge 310 of contact head 308. The user continues this action until edge 310 of contact head 308 protrudes through opening 227 of flange member 226. Once edge 310 of contact head 308 protrudes through opening 227 of flange member 226, filter seat 204 is completely inserted into opening 103 of seal member 100, edge portion 224 of filter holder 204 is supported by portion 104 of bottom side 25e, and mesh filter 202 is in communication with opening 25c and grinding chamber 29. When filter holder 204 is attached to panel member 25b and a user desires to remove filter holder 204, the user depresses push-button 312 so that lever 300 moves in the direction indicated by arrow 306. As a result, edge 310 of contact head 308 is withdrawn from opening 227 in flange member 226 and filter holder 204 drops down automatically, as indicated by arrow 322, thereby causing portion 104 to be removed from opening 222 of portion 216 of filter holder 204.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

What is claimed is:

1. A coffee maker comprising:
   a housing carrying a reservoir for receiving water for brewing;
   a heater supported by the housing for receiving water from the reservoir and heating the water in order to brew coffee;
   an infused beverage extractor disposed over a beverage container;

a grinding basket positioned above the extractor and having an interior for receiving ground coffee beans, the grinding basket having an exterior surface;

a heating element attached to the grinding basket for heating the grinding basket, the heating element comprising a heating wire, the heating wire being wrapped around the exterior surface of the grinding basket;

a heat distributor disposed over the grinding basket and the heating element; and a grinding device adjacent to the grinding basket and in communication with the interior of the grinding basket.

2. The coffee maker according to claim 1 further comprising means for supplying a voltage to the heating element.

3. The coffee maker according to claim 1 wherein the heat distributor comprises a sheet of aluminum foil.

4. The coffee maker according to claim 1 wherein the portion of the interior of the grinding basket in communication with the grinding device defines a grinding chamber.

5. The coffee maker according to claim 4 wherein the housing includes a generally horizontal panel member for supporting the grinding device, the horizontal panel member having an opening therein in communication with the grinding chamber.

6. The coffee maker according to claim 5 wherein the horizontal panel member comprises a top side confronting the grinding device and a bottom side, the coffee maker further comprising a mesh filter assembly removably attached to the bottom side of the horizontal support member, the mesh filter assembly comprising a mesh filter generally aligned with the opening in the horizontal panel member.

7. The coffee maker according to claim 6 wherein the mesh filter has a curved contour.

8. The coffee maker according to claim 7 wherein the mesh filter assembly further includes a filter holder, the filter holder comprising:

a base portion having a first end portion and a second end portion; and:

a filter seat attached to the base portion and located between the first and second end portions, the filter seat sized for receiving the mesh filter.

9. The coffee maker according to claim 8 wherein the filter holder further comprises a flange member attached to and vertically extending from the first end portion.

10. The coffee maker according to claim 9 further comprising means for releasably attaching the filter holder to the horizontal panel member.

11. The coffee maker according to claim 9 wherein the horizontal panel member defines a second opening adjacent to the opening of the horizontal panel member in communication with the grinding chamber, the horizontal panel member further comprising a protruding member that extends upwardly from the top side of the horizontal member and is adjacent the second opening, the horizontal panel member further comprising a support member attached to the bottom side of the horizontal member, the support member defining a slot sized for receiving the second portion of the filter holder.

12. The coffee maker according to claim 11 wherein when the filter holder is attached to the bottom side of the horizontal panel member, the flange member is disposed though the second opening and engaged with the protruding member and the second end portion of the filter holder is removably inserted into the slot of the support member, the coffee maker further comprising means for releasing the filter holder from the bottom side of the horizontal panel member.

13. The coffee maker according to claim 6 further comprising a seal member that seals the mesh filter to the opening in the horizontal panel member which is in communication with the grinding chamber.

14. A coffee maker comprising:

a housing carrying a reservoir for receiving water for brewing;

a heater supported by the housing for receiving water from the reservoir and heating the water in order to brew coffee;

an infused beverage extractor disposed over a beverage container;

a grinding basket positioned above the extractor and having an interior for receiving ground coffee beans, the grinding basket having an exterior surface;

a grinding device adjacent to the grinding basket and in communication with the interior of the grinding basket;

means for filtering ground coffee beans ground by the grinding device;

a heating device attached to the grinding basket for heating the grinding basket, the heating device comprising a heating wire, the heating wire being wrapped around the exterior surface of the grinding basket; and a heat distributor disposed over the grinding basket and the heating device.

15. The coffee maker according to claim 14 further comprising means for releasably attaching the filtering means to the coffee maker.

16. The coffee maker according to claim 14 wherein the portion of the interior of the grinding basket in communication with the grinding device defines a grinding chamber, the coffee maker further comprising a seal for creating a sealed relationship between the filtering means and the grinding chamber.

17. A coffee maker comprising:

a housing carrying a reservoir for receiving water for brewing;

a heater supported by the housing for receiving water from the reservoir and heating the water in order to brew coffee;

an infused beverage extractor disposed over a beverage container;

a grinding basket positioned above the extractor and having an interior for receiving ground coffee beans;

a device for heating the grinding basket;

a grinding device adjacent to the grinding basket and in communication with the interior of the grinding basket, the portion of the interior of the grinding basket in communication with the grinding device defining a grinding chamber;

means for filtering ground coffee beans emanating from the grinding chamber; and means for releasably attaching the filtering means to the housing.

18. A grinding basket for a coffee maker, comprising:

a generally streamlined body portion having an exterior surface and a sloped interior surface;

a heating element wrapped around the exterior surface of the streamlined body portion; and a heat distributor disposed over the streamlined body portion and the heating element so as to effect a uniform distribution of heat.

19. The grinding basket according to claim 18 further comprising means for supplying an electrical voltage to the heating element.

20. The grinding basket according to claim 18 wherein the heat distributor comprises a sheet of aluminum foil.

* * * * *